United States Patent
Shimojima

[11] 3,915,557
[45] Oct. 28, 1975

[54] ZOOM LENS
[75] Inventor: Masatoshi Shimojima, Tokyo, Japan
[73] Assignee: Optigon Research & Development Corporation, Santa Monica, Calif.
[22] Filed: Apr. 19, 1974
[21] Appl. No.: 462,300

[52] U.S. Cl. .............................. 350/187; 350/255
[51] Int. Cl.² .................. G02B 15/18; G02B 7/04
[58] Field of Search ............... 350/187, 184, 255

[56] References Cited
UNITED STATES PATENTS
3,619,035   11/1971   Hopkins .......................... 350/184
3,765,748   10/1973   Mito .............................. 350/187

*Primary Examiner*—Paul A. Sacher
*Attorney, Agent, or Firm*—DeLio and Montgomery

[57] ABSTRACT

A zoom lens mechanism in which a plurality of lens groups are moved axially unequal distances to effect change in focal length and all lens groups are shifted axially in fixed relation for focusing. A single operating member connected to the lens groups effects zooming upon axial movement and focusing upon rotative movement thereof.

12 Claims, 7 Drawing Figures

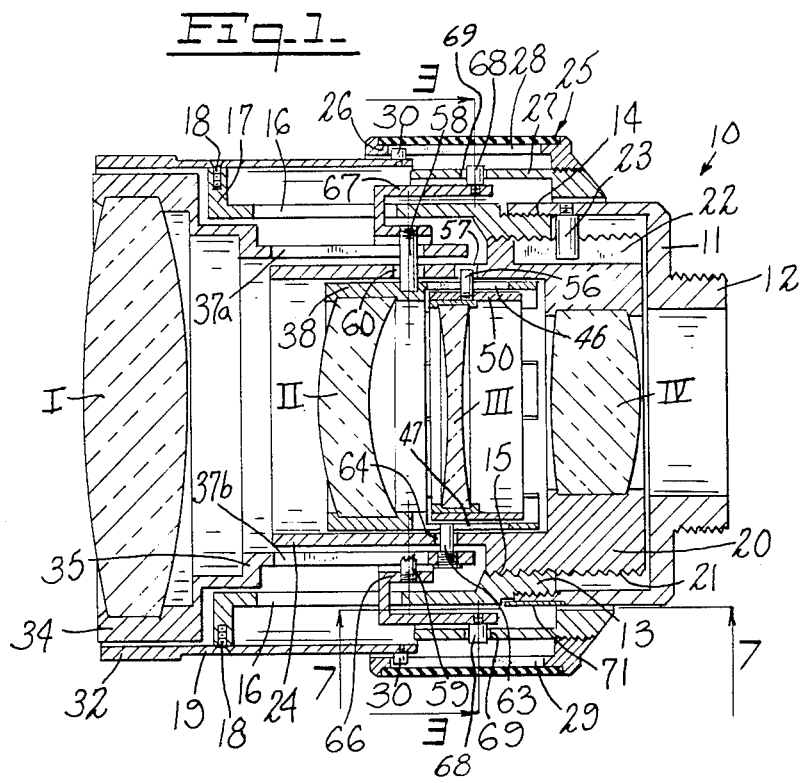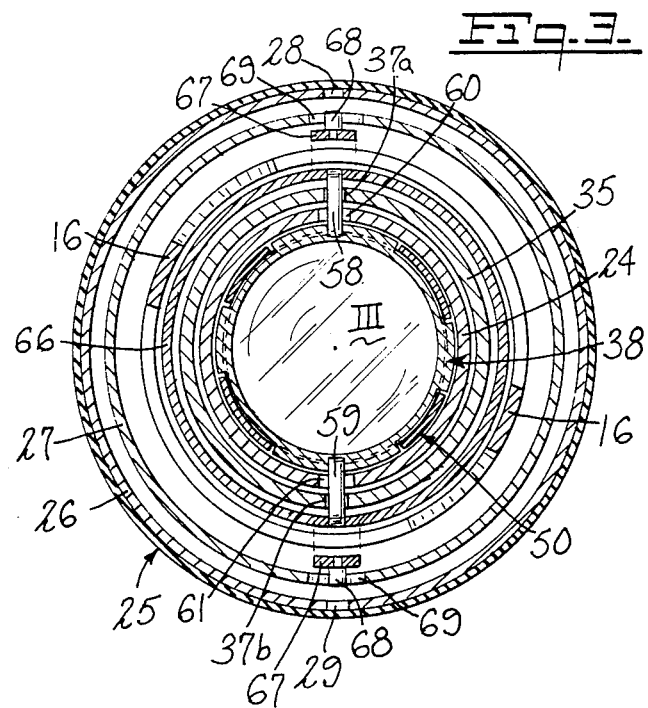

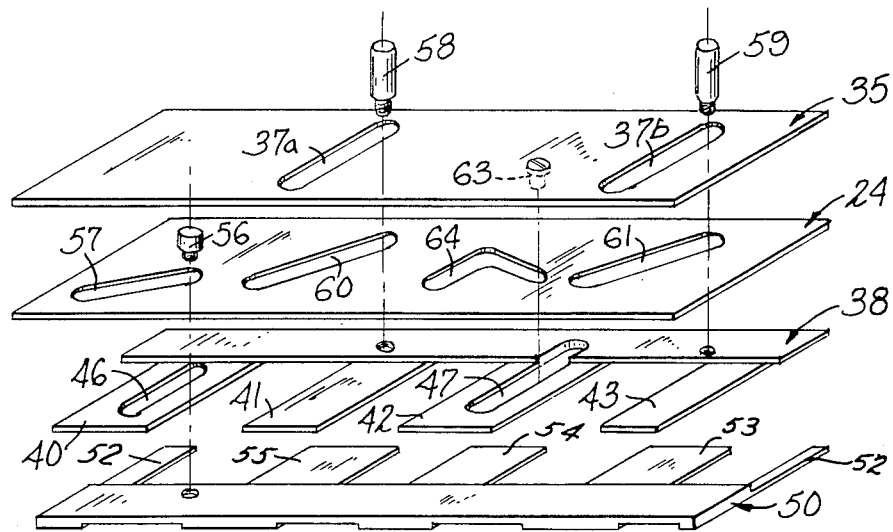
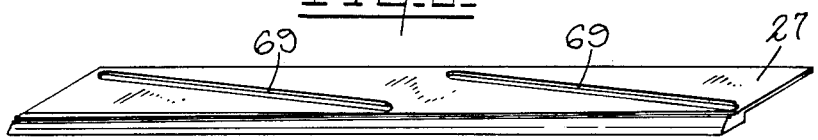
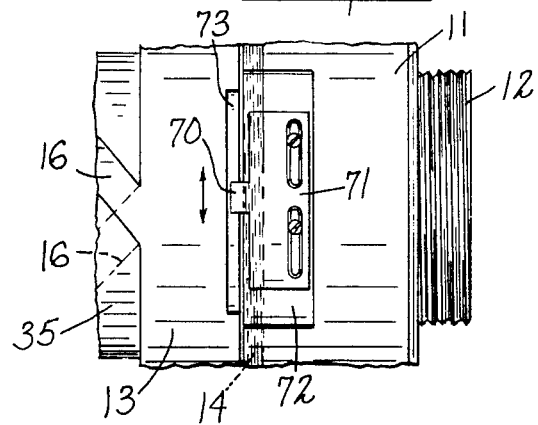

ZOOM LENS

This invention relates to lenses and more particularly relates to mechanisms for zoom lenses.

In zoom lenses a plurality of lens groups are generally utilized, some axially movable for zooming or change of focal length and image compensation, and some for focusing. A common arrangement is a four lens group in which the first group generally has limited axial motion for focusing; the second and third groups are axially moved to effect zooming or variation of the equivalent focal length (EFL), and the fourth lens group is stationary with respect to the film plane. Various mechanisms for producing movement of the lens groups for zooming with predetermined motion are well known. Such mechanisms include a so-called one touch control ring or sleeve for zooming and focusing, while some utilize separate rotatable control rings for zooming and focusing. The one-touch control is considered by many to be preferable in that it is not necessary to shift the hand between a zooming ring and a focusing ring.

In zoom lenses, the compactness of the lens is limited by the extent of the motions required by axial movement of the second and third groups and the spacing provided therefor to effect zooming over the desired range.

Recently lens have been optically designed as exemplified in the copending application of Ellis I. Betensky, Ser. No. 462,366 filed on the same date as this application, to provide more compactness in zoom lenses, particularly those of shorter focal lengths by axially moving the front group during zooming to change the position of an imaged object and decrease the travel required by the zooming or magnifying lens group. This decreases the front vertex distance (FVD) of the overall lens. Such movement of the front or first group may also contribute to optical correction of various aberrations which are otherwise present in zoom lenses.

The present invention provides a new and improved mechanism for providing unequal axial motion of two or more lens groups, including the front lens group in a zoom lens to vary the EFL of the lens and further provides a means for focusing the lens by axially moving all groups in fixed relation using the same control means as is utilized during zooming.

Briefly stated, the invention, in one form thereof, comprises a lens group guiding member having a plurality of guide means thereon which predetermine the movement of lens groups which are moved axially in unequal relation to zoom or vary the focal length of the lens. The lens guiding member may further mount a lens group in fixed relation therein. Means are provided for moving all of the movable groups in accordance with the defined guide means in non-equal relative relationship and the same operating means may be utilized to axially shift the guiding member including all lens groups in fixed relative relation to effect focusing. The invention is applicable to zoom lenses of various optical designs and number of lens groups.

An object of this invention is to provide a new and improved zoom lens mechanism.

Another object of this invention is to provide a new, improved, and simplified mechanism for imparting relative unequal motion to two or three lens groups to vary equivalent focal length of the lens, while permitting all lens groups to be shifted in fixed relation to each other for focusing.

A further object of this invention is to provide a mechanism for a lens of the type described in which the same control member may be utilized to effect zooming and also to effect axial shifting of all lens groups in fixed relation to effect focusing of the lens.

A further object of this invention is to provide a new and improved lens zooming mechanism that permits simultaneous non-equal axial motion of three different lens groups.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

FIG. 1 is a view of a lens mechanism embodying the invention in longitudinal half section;

FIG. 3 is a veiw seen in the plane of lines 3—3 of FIG. 1;

FIG. 5 is a developed planar view of elements of the lens of FIG. 1;

FIG. 6 is a developed planar view of the operating member of the lens of FIG. 1, seen from the inside thereof; and FIG. 7 is a view seen in the plane of lines 7—7 of FIG. 1.

The invention is applicable to lens of various focal length ranges and optical designs, but is disclosed in a zoom lens 10 for a 24×36mm image frame camera having a focal range of 36–83mm.

The lens 10 includes from the objective side a first lens group I of positive power, a second lens group II of negative power, a third lens group III of negative power, and a fourth lens group IV of positive power.

Figure 2:
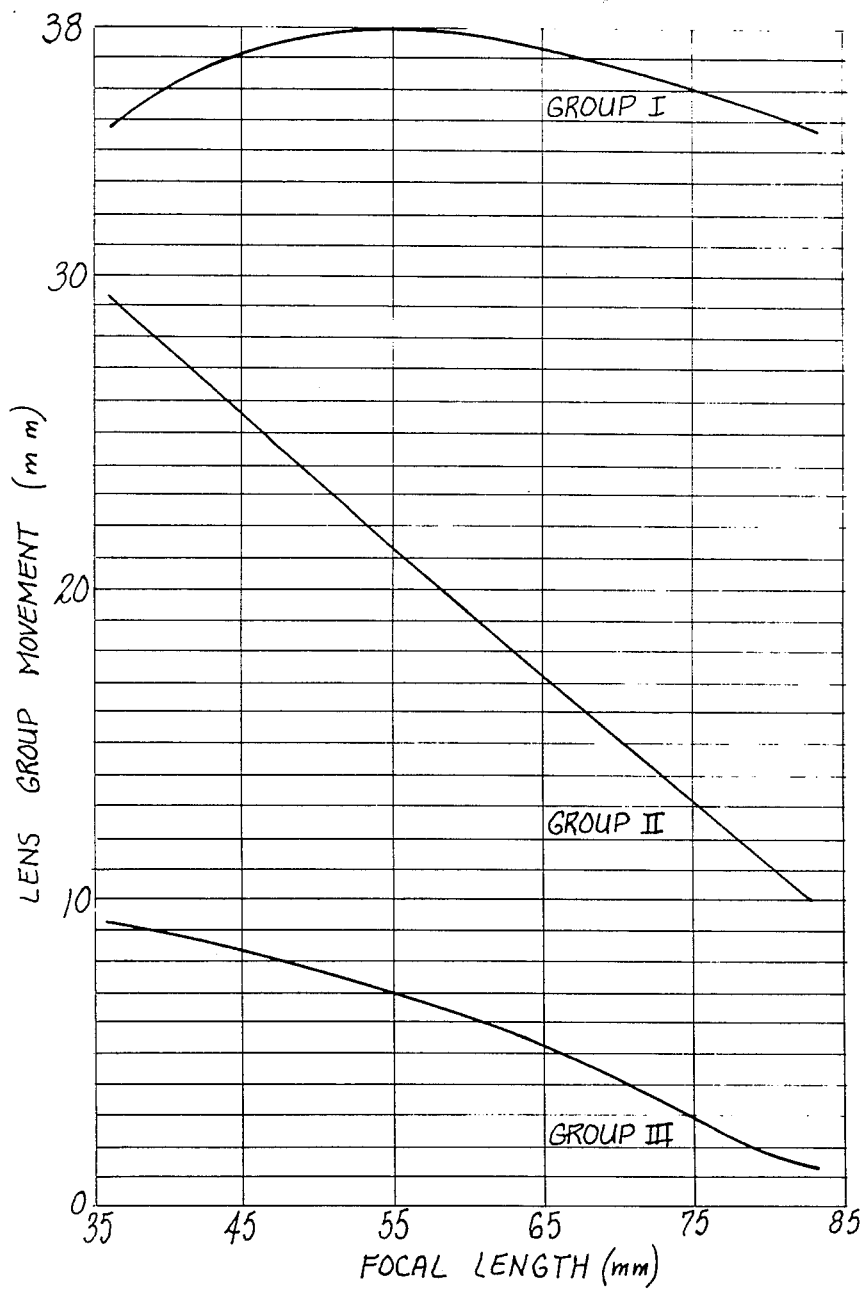
FIG. 2 is a graphical representation of the movements of the lens groups of the lens of FIG. 1.

As hereinafter described groups I, II and III are simultaneously axially movable unequal distances with respect to group IV to vary the focal length of the lens, and all groups are axially movable in fixed relation to focus the lens. The relative movements of groups I, II and III, with respect to the axial object side vertex of group IV is shown in FIG. 2. The optical properties of a lens as disclosed for a 36–83mm focal length range are disclosed and claimed in copending application Ser. No. 462,366 filed on the same date as this application.

Lens 10 comprises a housing member 11, having a camera mounting portion 12, shown as a thread mount. However, a bayonet mount may also be provided. Carried with housing member 11 is a focusing member 13, threadably mounted to housing 11 at 14, and having internal threads 15. Member 13 has limited rotation on threads 14 as hereinafter described. Member 13 has longitudinally extending, angularly spaced arms 16 which extend to a ring 17. Ring 17 is fastened as by screws 18 to an outer sleeve mmember 19. Sleeve member 19 is an extension of focusing member 13. A member 20 has external threads 21 mating with threads 15. A longitudinal slot 22 is defined in threads 21, and a pin 23 carried by housing 11 extends into slot 22. This arrangement provides a means for shifting member 20 axially without rotation. The threads 15 and 21 have a much greater pitch than threads 14. Member 20 has a forwardly extending cylindrical or tubular portion 24 having a plurality of lens guide means defined therein, as hereinafter explained. Tubular portion 24 functions as a lens support member and lens zooming guide member.

An operating member 25 for both focusing and zooming comprises an outer sleeve 26, and an inner sleeve 27. Outer sleeve 26 has longitudinal slots 28 and 29 therein, each receiving a pin 30 extending from sleeve member 19. Such pin and slot arrangement permits axial or longitudinal movement of operating member 25 with respect to sleeve member 19, but connects the two for rotational motion.

Sleeve member 19 has a forwardly extending portion 32 in sliding contact with a mount 34 for lens group I (space shown therebetween for clarity). Mount 34 has a rearwardly extending cylindrical portion 35 coaxially overlying tube 24 (portion 35 is in practice in sliding contact with tube 24, but clearance is shown for clarity). Portion 35 has longitudinal slots 37a and 37b defined therein for reasons hereinafter described.

Lens group II is carried in a mounting member 38 within tube 24. Member 38 as more clearly shown in FIGS. 3 and 4, comprises an annular lens mounting portion 39 having a plurality of guide shoes or finger 40 – 43 extending rearwardly therefrom. The shoes or fingers are raised from the peripheral surface 45 of portion 39. The external surfaces of shoes 40 are formed on a common radius and slidably engage the internal periphery of tube 24. The length of the shoes 40 –43 serve to essentially eliminate tilt of lens group II. Longitudinally directed slots 46 and 47 are defined in shoes 40 and 42, respectively.

Lens group III is carried in a mounting member 50 having an annular mounting portion 51 with guide shoes 52–55 extending forwardly therefrom. Shoes 52–55 have peripheral surfaces raised with respect to the surface of portion 51. The external surfaces of shoes 52–55 are defined on a common radius and slidably engage the inner periphery of tube 24. The length of shoes 52–55 essentially eliminates tilt of lens group III.

Figure 4:
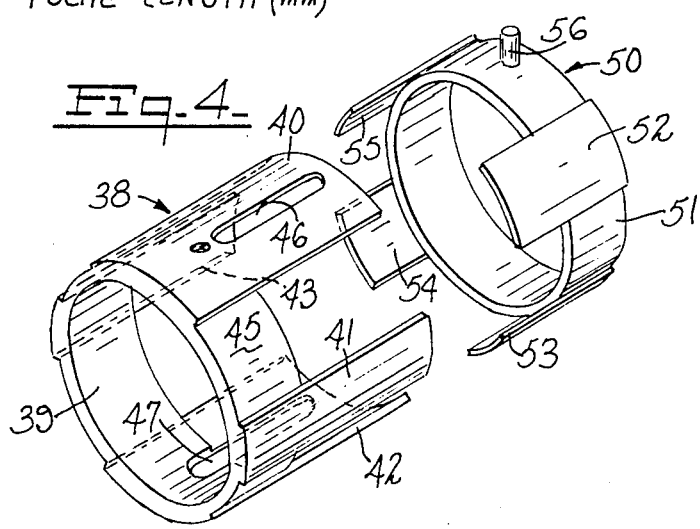
FIG. 4 is a view in perspective of lens mounts of the lens of FIG. 1.

Reference is now made to FIG. 5 which shows a planar developed view of the tube 24, cylindrical portion 35 of mount 34 and mounts 38 and 50, in conjunction with FIGS. 1, 3 and 4.

A follower pin 56 extends from mounting member 50 through slot 46 in shoe 40 of member 38 into a guide means in the form of a cam slot 57 in tube 24. Pins 58 and 59 extend from member 38 through similar guide means in the form of cam slots 60 and 61 in tube 24, and into slots 37a and 37b, respectively, in member 35. A follower pin 63 carried in member 35 extends through a guide means in the form of a cam slot 64 in member 24 into slot 47 in mount 38.

Pin 58 and pin 59 extend into a ring 66 (FIG. 1) about member 35 and tube 24. Ring 66 has a pair of outer rearwardly extending lugs 67 which threadably receives pins 68 extending into slots 69 in portion 27 of operating member 25. Slots 69 are contoured in accordnce with the pitch of threads 15 and 21 as shown in FIG. 6 for reasons hereinafter made apparent.

The operating member 25 is arranged to effect zooming of the lens upon axial sliding movement along sleeve 19 with respect to tube 24, and focusing of the lens upon rotation thereof.

For focusing, member 25 is rotated. The connection of pins 30 in slots 28, 29 produces rotation of member 13 through arms 16. The rotational motion of member 13 on fine pitch threads 14 is limited by a detent 70 extending from an angularly positionable member 71 positioned in a recess 72 on housing member 11. Detent 70 extends into a notch 73 in member 13 to limit rotation thereof and retain it on threads 14. Member 20 is restrained from rotation by pin 23 and moves axially of housing 11. As member 20 moves axially lens groups II, III and IV therein move in fixed relative relation. Cylindrical portion 35 of lens amount 34 rides on tube 24 and all lens groups therefore move axially in fixed relation. Such motion is similar to movement of a lens of predetermined focal length in focusing.

For zooming, groups I, II and III move relative to group IV as shown in FIG. 2, with variation in focal length. In this arrangement, group I is moved to decrease the extent of motion required by group II and group III, and provide a more compact lens. The movements shown in FIG. 2 are for a lens of 36–83mm equivalent focal length for an image frame of 24×36mm. However, the movements and mechanism therefor described may be utilized in lens of various sizes and focal length ranges.

As operating member 25 is moved axially with respect to tube 24, pins 58 and 59 connected to ring 66 and mount 38 move axially and rotatively in guide slots 60 and 61. See FIG. 5. This imparts a predetermined axial and rotative movement of mount 38 and lens group II. As mount 38 rotates the edges of slot 46 engage pin 56 and impart rotational movement thereto. This causes pin 56 and mount 50 with lens group III to follow the contour of guide means or cam slot 57 in tube 24. Mount 50 and lens groups III thus has the motion shown in FIG. 2. Pin 63 carried in portion 35 and extending through guide menas or cam slot 64 in tube 24 is received in slot 47. The edges of slot 47 angularly move pin 63 in slot 64 to predetermined the relative axial movement of member 35 and hence mount 34 and lens group I. Group I moves simultaneously with group II and group III upon axial movement of member 25. During only axial movement of member 25, there is no movement of Group IV.

With the arrangement described, motion imparted to one lens group (group II) in accordance with its guide means produces predetermined relative axial motion of two other lens groups in accordance with their respective guide means. If desired or necessary in accordance with an optical design, one or more guide slots may be contoured to provide a dwell of one or more lens groups during a portion of the zooming range. The follower pins and cam slots are sized to minimize any lost motion.

The portion 27 of operating member 25 is provided with circumferentially extending slots 69 receiving pins 68 attached to the rearwardly extending lugs 67. The slots 69 are defined on the same pitch as threads 15. As member 13 and tube 24 advance or retract during focusing movement as operating member 25 is rotated, pins 68 will advance and retract. The contour of slots 69 permits free movement of pins 68 with rotation and axial movement of member 25 and prevents any binding or undesired longitudinal motion of member 20. This arrangement does permit simultaneous axial and rotational movement of operating member 25 for continuous focusing while zooming. The interdigitating shoes 40 - 43 and 52 - 55 of lens mounts 38 and 50 have sufficient angular clearance therebetween for the relative axial motion required.

It will be understood that various relative motions may be imparted to the movable lens groups dependent on the shape of the guide or cam slots. While not readily apparent from the drawings, the slots 57, 60, 61 and 74 all have the same minimum dimension for pin travel to prevent any binding. The slots may be termed cams or guides and the respective pins as followers inasmuch as the pins follow the guide or cam slots.

The relative lens powers may vary for different optical designs and focal length ranges and the particular lens power arrangement shown herein is only exemplary. The invention further includes a zoom lens having only three lens groups all of which more relatively for zooming, and in fixed relation for focusing. Also included are lens having only two groups for zooming which move axially with respect to one or more non-zooming groups, and all move in fixed relation for focusing.

The invention is applicable to any zoom lens design where lens groups are relatively moved in guide means in or on a guide member for change of focal length and the guide member is shifted axially for focusing.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A lens comprising a housing, first, second and third lens groups in first, second and third mounts therefor, respectively, a guide member, said guide member supporting said mounts thereon and having first, second and third guide means, respectively, for predetermining unequal axial movement of said three mounts to vary the focal length of said lens, an operating member movable axially and rotatively with respect to said guide means, said operating member coupled to said lens mounts so that axial movement thereof with respect to said guide member causes said mounts to move axially with unequal movement in accordance with the respective guide means to vary the focal length of said lens, and means coupling said operating member to said guide member whereby rotation of said operating member shifts said guide member axially of said housing member for focusing of said lens with said mounts in fixed relation.

2. The lens of claim 1 wherein said guide member further mounts a fourth lens group therein.

3. The lens of claim 2 wherein said guide means comprise first, second and third slots in said guide member and said mounts carry first, second and third followers extending into said slots.

4. The lens of claim 3 wherein said guide member is tubular in form, said first mount has a rearwardly extending cylindrical portion overlying said guide member and slidably carried thereon, at least one longitudinally directed slot in said first mount, said second follower extending from said operating member through said longitudinal slot and said second cam slot to said second mount.

5. The lens of claim 4 wherein said second mount is movable axially and rotatively in said guide member, a second longitudinal slot defined in said second mount, and a first follower extending from said first mount through said first slot in said guide member into said second longitudinal slot whereby rotative movement of said second mount causes said first mount to move in accordance with said first slot.

6. The lens of claim 5 wherein said third mount is disposed within said guide member and movable axially and rotatively therein, a third follower extending from said third mount through another longitudinal slot in said second mount into said third slot in said guide member.

7. The lens of claim 1 wherein said operating member is a sleeve coaxial with said guide member, a focusing member rotatable with respect to said housing, said coupling means comprising a longitudinal slot in said sleeve member receiving a pin therein carried by a connecting sleeve member, said connecting sleeve member connecting said focusing member to said operating member, said guide member being threadably coupled to said focusing member and restrained from rotation.

8. A lens assembly comprising a housing, a cylindrical member in said housing, first and second lens groups including first and second mounts therefor coaxially supported on said cylindrical member, first and second guide means on said cylindrical member, a follower member on each of said mounts adapted to cooperate with one of said guide means to predetermine movement of said mounts with respect to said cylindrical member, said guide means having both axial and rotational directional components, an operating member, means mounting said operating member for axial and rotational movement with respect to said cylindrical member, said operating member connected to one of said mounts so that axial movement of said operating member moves said one mount axially and rotatively with respect to said cylindrical member in acccordance with the guide means for said one mount, means connecting said one mount to said other mount so that rotation of said first mount causes said second mount to move axially and rotatively in its guide means whereby longitudinal movement of said operating member produces unequal axial movement of said mounts with respect to said cylindrical member, and means connecting said operating member to said cylindrical member so that rotation of said operating member shifts said cylindrical member axially with said mounts in fixed relation.

9. The lens assembly of claim 8 further including a third lens group and mount therefor, said third mount having a cylindrical portion slidably carried on the outer surface of said cylindrical member, a third guide means on said cylindrical member for said third mount, and means connecting one of said first and second mounts to said one mount through said third guide means whereby rotative movement of said one mount moves said third mount in accordance with said third guide means.

10. The lens of claim 9 wherein said guide means are slots in said cylindrical member, said one mount has first and second longitudinal slots therein and said third mount has at least one longitudinal slot therein, a first pin from said operating member extending through said at least one longitudinal slot and the first guide slot in said cylindrical member to said one mount, a second pin carried by said second mount and extending through the other longitudinal slot in said second mount to the second guide slot in said cylindrical member, a third pin from said third mount extending through said third guide slot into one of the longitudinal slots in said second mount.

11. A lens comprising a housing member, a focusing member in said housing and rotative with respect thereto, a lens guide member in threaded engagement with said focusing member and restrained from rotation whereby rotative movement of said focusing member shifts said support and guide member axially of said housing, first and second lens groups in first and second mounts, respectively, said mounts carried on said guide member, first and second guide means on said guide member for predetermining relative unequal axial motion of said first and second mounts on said guide member, an operating member disposed about said guide member and connected to said focusing member so that rotation of said operating member rotates said focusing member and axially shifts said guide member, and means connecting said operating member to said lens mounts so that axial movement of said operating member moves said mounts axially of said guide member in accordance with said guide means.

12. A lens assembly comprising a housing member, a focusing member rotatable in said housing, a cylindrical lens support member threadably connected to said focusing member but restrained from rotation so that upon rotation of said focusing member said support member is axially shifted, an operating member comprising inner and outer sleeves, means connecting said outer sleeve to said focusing member whereby rotation of said operating member rotates said focusing member while allowing said operating member to move axially with respect to said focusing member, a lens mount coaxially disposed with respect to said support member and mounting a lens group therein, a guide slot having rotative and axial components defined in said support member, a follower extending from said mount through a guide slot, a connecting member between said follower and said inner sleeve whereby axial movement of said operating member produces axial and rotative motion of said lens mount in said guide slot to change the focal length of said lens, said connecting member including a pin extending into a substantially annularly directed slot in said inner sleeve having an axial pitch essentially the same as the pitch of the threaded connection of said support member to said focusing member.

* * * * *

UNITED STATES PATENT AND TRADEMARK OFFICE
CERTIFICATE OF CORRECTION

PATENT NO. : 3,915,557
DATED : OCTOBER 28, 1975
INVENTOR(S) : MASATOSHI SHIMOJIMA

It is certified that error appears in the above-identified patent and that said Letters Patent are hereby corrected as shown below:

Column 4, line 37, change "menas" to --means--.

Column 7, line 14, delete "support and".

Signed and Sealed this

Twentieth Day of May 1980

[SEAL]

Attest:

SIDNEY A. DIAMOND

Attesting Officer      Commissioner of Patents and Trademarks